United States Patent Office 3,122,243
Patented Feb. 25, 1964

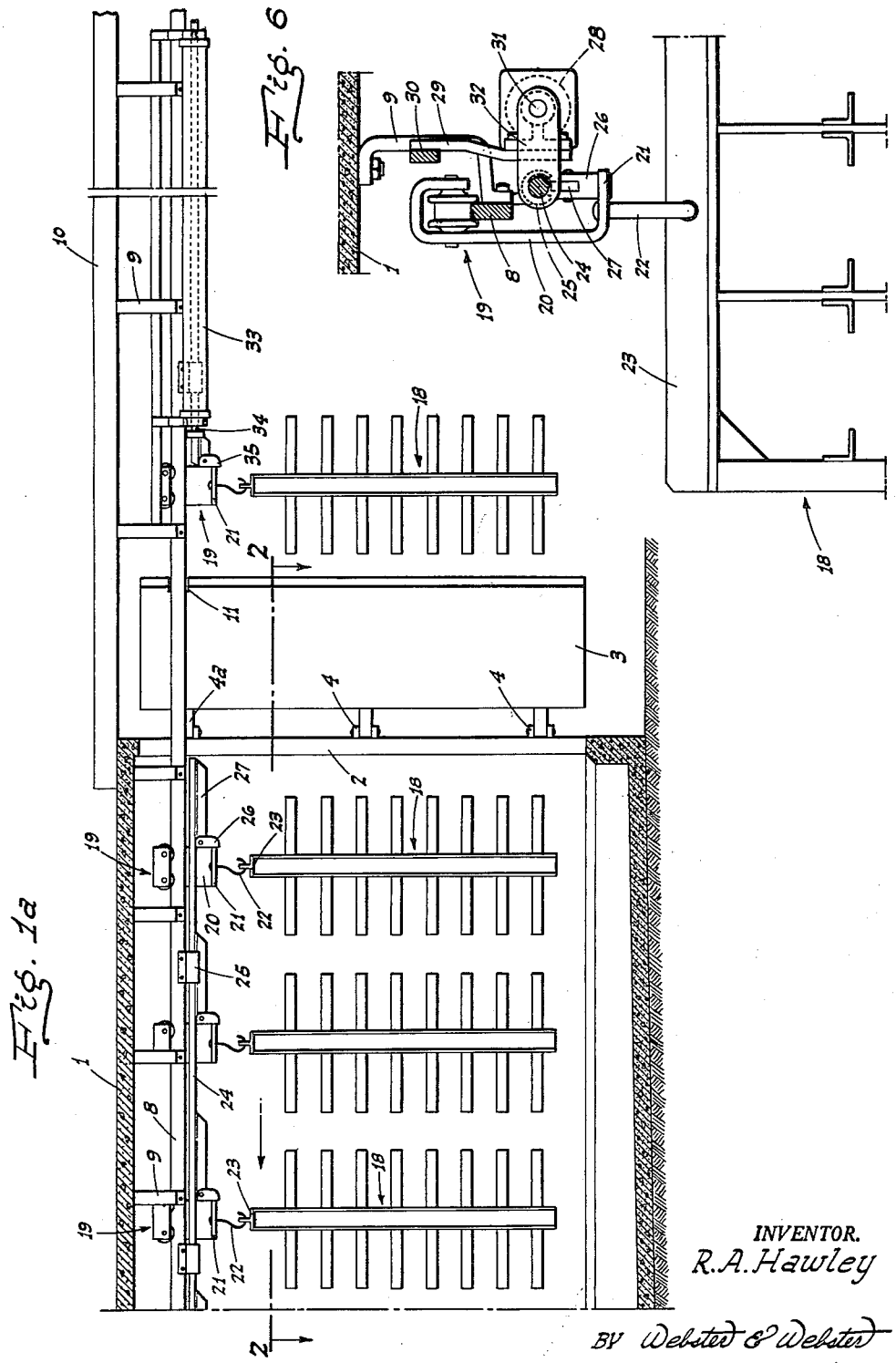

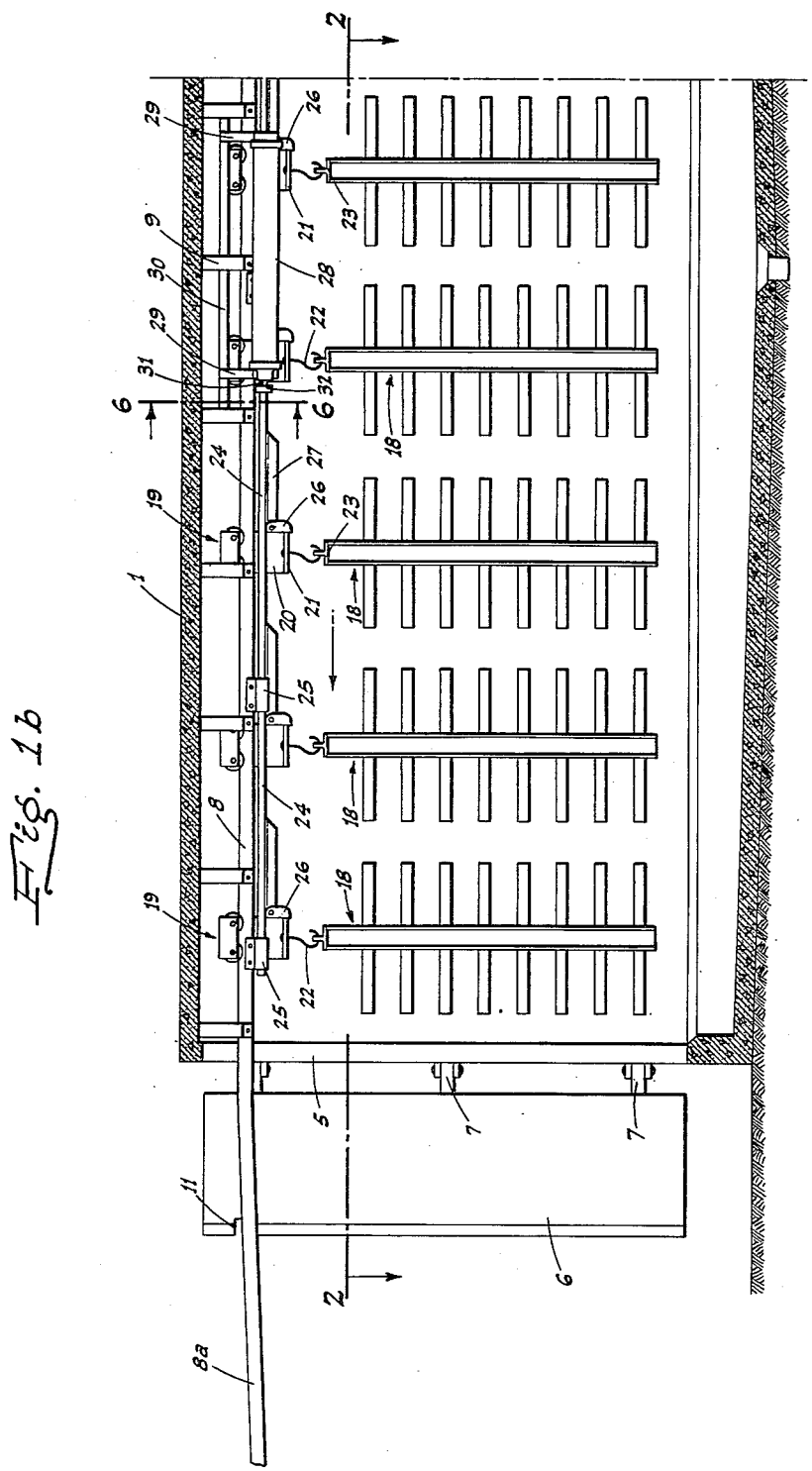

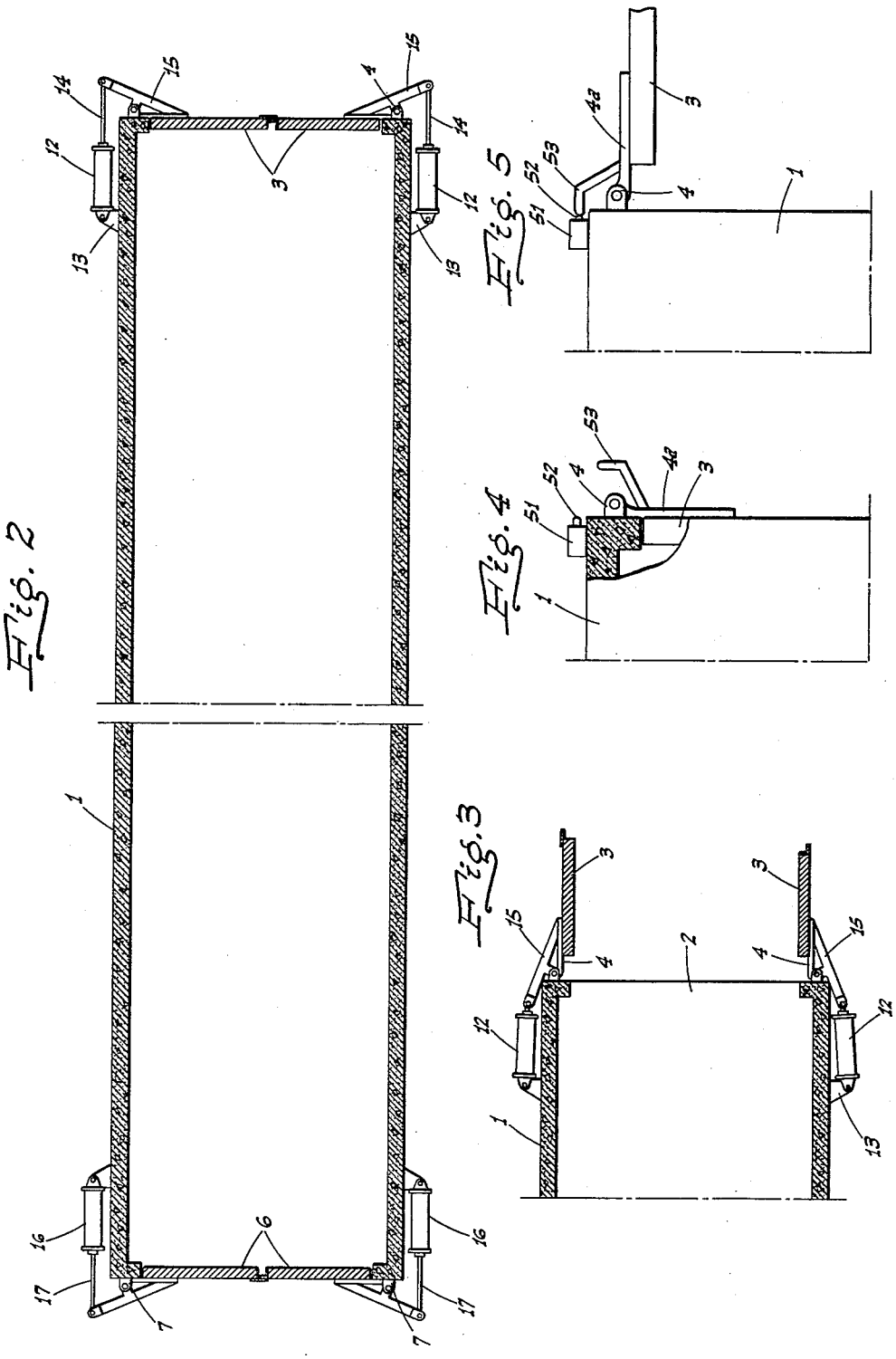

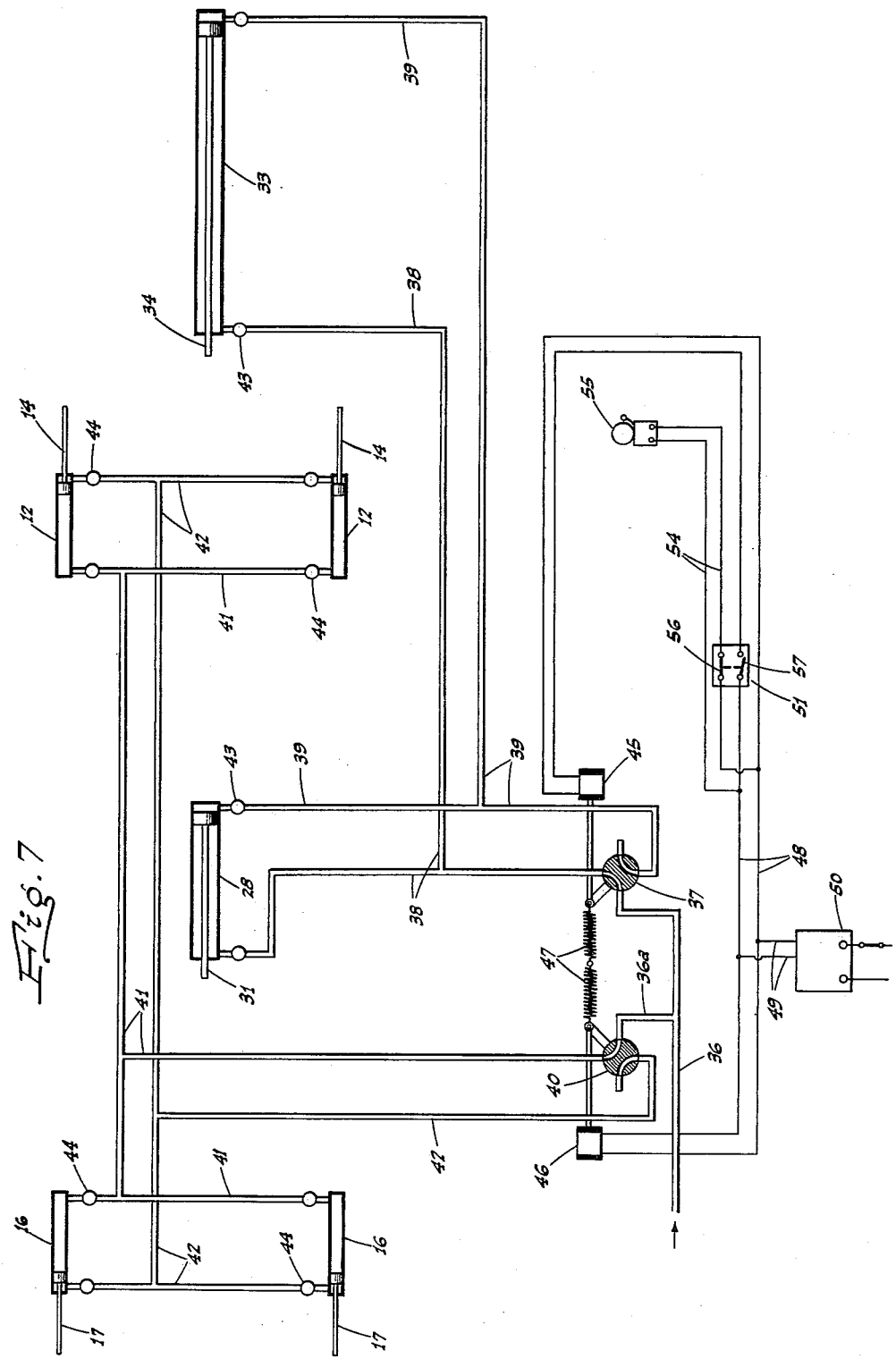

3,122,243
INTERMITTENT FEED APPARATUS FOR RAIL SUSPENDED RACKS
Richard A. Hawley, 2440 Scout Road, Oakland, Calif.
Filed Jan. 15, 1962, Ser. No. 166,329
4 Claims. (Cl. 214—17)

This invention relates to commercial food cooking or processing apparatus in which the food to be cooked is placed on racks which are moved through a cooking cabinet in intermittent steps; one rack being withdrawn from the cabinet after the cooking period has been completed, while another rack is then admitted to the cabinet to undergo the cooking action.

A major object of this invention is to provide, with an elongated cabinet for the purpose having normally closed entry and exit doors, such cabinet being designed to contain a number of rail-supported racks, an apparatus to move the racks through the cabinet in step-by-step order, and which apparatus includes means to automatically open the doors while the racks are being thus moved so that one rack may be discharged from the exit end of the cabinet, while another—having uncooked food—is being inserted into the cabinet from the entry end thereof.

As soon as the above-noted rack feeding step is completed, the doors will automatically close and will remain closed until it is time for another rack-advancing step, which also takes place automatically.

By reason of the apparatus, as above, the food on each and every rack will be subjected to the same cooking period, and each rack in turn will be discharged from the cabinet as soon as the proper and predetermined cooking time has elapsed.

In connection with the foregoing features, it is another object of the invention to provide an audible signal or alarm device, which will be placed in operation upon the doors starting to open, so as to warn the attendants that such action is about to take place, and which will be automatically discontinued as soon as the doors become fully opened.

A further object of the invention is to provide a mechanism for intermittently feeding or advancing a row of racks or the like along a predetermined path, irrespective of whether or not such racks are enclosed or out in the open.

It is also an object of the invention to provide a practical, reliable, and durable intermittent feed apparatus for rail suspended racks, and one which will be exceedingly effective for the purpose for which it is designed.

These objects are accomplished by means of such structure and relative arrangement of parts as will fully appear by a perusal of the following specification and claims.

In the drawings:

FIG. 1a is a sectional elevation of the entrance portion of a food cooking or processing cabinet, together with the intermittently functioning food rack feeding structure associated therewith.

FIG. 1b is a similar view of the discharge end portion of the cabinet and rack feed structure; FIGS. 1a and 1b together forming the complete apparatus.

FIG. 2 is a sectional plan, foreshortened, of the cabinet alone, taken substantially on line 2—2 of FIGS. 1a and 1b, but showing the entry and exit doors closed.

FIG. 3 is a similar fragmentary view of the entry end portion of the cabinet, showing the adjacent doors open.

FIG. 4 is a fragmentary enlarged top plan view of the entry end portion of the cabinet, showing the adjacent door closed, and the switch controlled thereby open.

FIG. 5 is a similar view, showing said adjacent door open and the switch closed.

FIG. 6 is a fragmentary enlarged cross section taken on line 6—6 of FIG. 1b.

FIG. 7 is a diagram of the compressed air and electrical control system of the apparatus.

Referring now more particularly to the drawings, and to the characters of reference marked thereon, the food cooking or processing cabinet 1 with which the improved intermittent feed structure is associated is an elongated tunnel-like member of rectangular form in cross section, and initially open at both ends. The entry end 2 of the cabinet is provided with closure doors 3 connected to the cabinet for opening and closing swinging movement in a horizontal plane by vertically spaced hinges 4. The exit end 5 of the cabinet is also provided with similar doors 6, similarly connected to the cabinet by hinges 7.

A horizontal rail 8 is disposed in the cabinet centrally of the width and a short distance below the top thereof; being supported at intervals from said top by hangers or brackets 9 secured to said rail on one side thereof, as shown particularly in FIG. 6. The rail 8, which extends the full length of the cabinet, also extends a material distance outwardly beyond the entry end of the cabinet; additional ones of the hangers 9 supporting the extended portion of the rail from a suitably mounted longitudinally extending beam 10 or the like.

An extension 8a of the rail 8 projects at a slight downward slope from the exit end of the cabinet, as shown in FIG. 1b, for the purpose which will be seen later. In order to avoid any conflict of the rail extensions with the doors 3 and 6 when the latter are closed, the free end of one door of each pair is notched, as indicated at 11, to straddle the rail, and thus enabling the doors to have a close fit with each other, as is desirable.

The doors 3 are swung between closed and open positions by means of compressed air cylinders 12, one for each door; each cylinder being disposed in a horizontal position in line with an intermediate one of the hinges 4 and extending along the outside of the cabinet, and swivelly connected thereto by a bracket 13. The piston rod 14 of each cylinder 12 projects from the forward end thereof and is connected to an arm 15 rigid with and projecting from the outer face of the related door; said arm being disposed so that the piston rod is fully extended when the door is closed. Similar compressed air operated cylinders 16, having piston rods 17 connected to adjacent doors 6, are disposed at the exit end of the cabinet to control the opening and closing of the exit doors 6.

The food to be cooked or otherwise processed is placed on suitable racks or carriers 18 which are detachably connected to and hang from trolleys 19 riding the rail 8. The trolleys, which are all independent of each other as are the racks, each includes a frame 20 depending from the side of the rail opposite the hangers 9, said frame terminating in a horizontal flange 21 from which a hook 22 depends, said flange and hook being some distance below the rail but the hook being in vertical alinement therewith, as shown in FIG. 6, and engaging the top cross bar 25 of the rack 18.

Extending the full length of the cabinet 1 parallel to the rail 8 and disposed at a level between said rail and the flanges 21 of the trolleys 19 is a rod 24, slidable through bearing sleeves 25 disposed at intervals along and supported from rail 8. At evenly spaced intervals throughout its length, depending swivel pawls 26 are mounted on one end of ribs 27 rigid with and extending lengthwise of the rod along the lower edge thereof. The pawls are in position to engage the rear edges of the frame flanges 21 of the trolleys 19, and since the length of the cabinet is such as to hold a certain number of evenly spaced trolleys and supported racks 18 therein, there is a corresponding number of pawls 26 mounted in connection with the rod 24.

The pawls 26 are arranged so that they will remain rigid upon the forward movement of the rod 24 so as to then advance the various trolleys and racks therewith toward the exit end of the cabinet. Said pawls 26 will, however, swing and yield upwardly with the rearward movement of the rod 24 so that said pawls will pass over the various flanges 21 without also retracting the trolleys and racks. Reciprocating movement of the rod 24 through a stroke not less than the spacing between adjacent trolleys and racks is imparted to said rod by means of a compressed air ram 28 (see FIG. 1b).

This ram is disposed in the cabinet intermediate the ends thereof parallel to the rod 24, and preferably at the level thereof and laterally out therefrom on the side opposite the depending trolley frames, as shown particularly in FIG. 6. The ram 28 is mounted in a fixed position in the cabinet by means of hangers 29 depending from a horizontal bar 30 which is supported from adjacent hangers 9.

The piston rod 31 of the ram 28 is rigidly connected to the rod 24 by a bar 32. It may here be noted that the rod bearing sleeves 25 are slit along the bottom in order to allow the ribs 27 to move therepast as the rod 24 is reciprocated, and so enable the sleeves to be close enough together for efficient rod support and guidance.

In order to advance a trolley 19 and rack 18 supported thereby into the cabinet from in front of the same, another horizontal compressed air ram 33 is supported from the adjacent portion of the rail 8 back of the last named trolley in substantially the same manner as described in connection with ram 28. The piston rod 34 of ram 33 is suitably connected to a pawl 35 positioned to engage the forward edge of the adjacent trolley 19, said pawl being mounted for upward and rearward yielding movement just as are the pawls 26, so that another trolley and rack may be moved along the rail to a position just rearwardly of the pawl 35 from ahead of the ram 33.

When the piston rod 34 is fully retracted and the outside trolley 19 is in a pawl engaging position, said trolley and the rack 18 supported thereby are disposed in front of and clear of the doors 3 when open, as shown in FIG. 1a. The ram 33 must therefore have a stroke considerably longer than that of ram 28 in order to move the outside rack into the cabinet to the position originally occupied by the rack just inside the cabinet and said inside rack is being moved forwardly the comparatively short distance.

In order to intermittently move the racks 18 through the cabinet, and, if said cabinet is full, discharge one at a time from the exit end of the cabinet while admitting a rack to the entry end of the cabinet, and also automatically open and close the doors 3 and 6 between such discharge and admission, the control system shown in FIG. 7 is employed.

This system comprises a compressed air supply conduit 36 leading to a four-way valve 37, from which a conduit unit 38 leads to one end of both of the rams 28 and 33, while another conduit unit 39 leads from said valve to the other end of both rams 28 and 33. The supply conduit 36 has a branch 36a leading to another four-way valve 40, from which a conduit unit 41 leads to one end of both cylinders 12 as well as to the corresponding end of both cylinders 16. Another conduit unit 42 also leads from the valve 40 to the other end of both cylinders 12, as well as to the other end of both cylinders 16.

Adjustable air-flow retarders of conventional character, and indicated at 43, are interposed in the conduit units 38 and 39 adjacent the connection thereof with the rams 28 and 33, while similar retarders, indicated at 44, are interposed in the conduit units 41 and 42 adjacent the connection thereof with the cylinders 12 and 16.

The operation of the valves 37 and 40 in one direction is electrically controlled, the valves being operatively connected to solenoids 45 and 46, respectively. Springs 47 return the valves to a certain position when the solenoids are deenergized. When the valves are in such position, air is fed to the different rams and cylinders to retract the various trolley engaging pawls, and to also close and hold the doors 3 and 6 closed.

The functioning of the solenoids in a predetermined timed order is accomplished in the following manner:

The solenoids are connected to the opposite ends of a pair of circuit wires 48, which are connected intermediate their ends to circuit wires 49 leading from an automatic timer (such as the "Mara"), indicated at 50, and to which current to energize the circuit wires is supplied from a suitable source as usual.

Interposed in the wires 48 between their connection with the wires 49 and the solenoid 45 is a normally open micro switch 51. This switch is shown in FIGS. 4 and 5 as being mounted on one side of the cabinet 1 at the entry end thereof, and at the level of the upper one of the hinges 4 of the related door 3. The switch actuating push button 52 of said switch 51 faces rearwardly, and is in a protruding position when the adjacent door 3 is closed, as shown in FIG. 4. The button is pushed in, to close said switch 51 upon the adjacent door 3 being opened, by means of a rigid finger 53 mounted on and projecting from the door-connected hinge leaf 4a of said hinge 4 and disposed to engage and so push the button 52 only as said door 3 reaches a fully open position as shown in FIG. 5.

A branch circuit 54, in which an alarm or signal bell 55 is interposed, is connected to the wires 48 between the timer 50 and the micro switch 51; said switch including a switch element 56 interposed in one of the wires of circuit 54 and connected to the main switch elements 57 of the micro switch in such a manner that when the circuit which includes the adjacent portions of wires 48 is closed, the circuit through the wires 54 to the alarm bell is open, and vice versa.

In operation, with the cabinet 1 initially filled to capacity, as shown in FIGS. 1a and 1b, with the doors 3 and 6 closed to confine the cooking heat within the cabinet, and with another trolley and rack unit waiting to be fed into the cabinet, the parts of the intermittent feed and control structure occupy the positions shown in FIG. 7. As will be seen, the valve 40 is then disposed to admit compressed air to one end of the cylinders 12 and 16 so as to close and maintain the related doors closed. At the same time, the valve 37 is disposed to admit compressed air to one end of the rams 28 and 33 to maintain the piston rods 31 and 34, respectively, thereof in a fully retracted position; the solenoids 45 and 46 which are connected to said valves 37 and 40 being then deenergized and said valves being moved to the above named positions by the springs 47.

When the doors 3 and 6 are closed as above noted, the switch element 57 of switch 51 is open, while the switch element 56 of said switch is then closed. When the timer 50, with its automatic functioning, then moves to energize the circuit 48, the branch circuit 54 will be closed to actuate the alarm bell 55, and at the same time the solenoid 46 will be energized. This will cause the valve 40 to be moved to a position such that air will now be admitted to the other end of the cylinders 12 and 16 and exhausted from said one end thereof. As a result, the doors 3 and 6 will be opened, the bell 55 warning the attendants that such door opening is taking place. When the doors reach their fully open position, the switch element 57 of switch 51 is closed by the mechanism previously described; the circuit to the solenoid 45 is closed; and at the same time the circuit to the alarm bell 55 is opened by reason of the connection of the switch element 56 with element 57.

As soon as solenoid 45 is thus energized, the valve 37 is turned so that air is admitted to the other end of both of the rams 28 and 33, while the air is exhausted from said one end thereof. As a result, the entire row of racks is advanced in the cabinet a distance equal to the spacing between adjacent racks, while at the same time the rack outside the cabinet is advanced into the same the greater distance necessary for such rack to take the place of the endmost rack in the cabinet and which has just been moved forwardly. The adjustable air-flow retarders 43 in the air lines 38 and 39 leading to and from the rams 28 and 33 enable the timing of the movement of the various racks to be accurately controlled, so that there will be no lag or overrun of the initially exterior rack relative to those in the cabinet as they are similarly moved.

Upon the rack shifting movement being completed, the timer 50 immediately functions to open the circuit 48; de-energizing the solenoids 45 and 46. The springs 47 then act to return the valves 37 and 40 to their initial positions, or so that air is again admitted to said one end of the cylinders 12 and 16, and to said one end of the rams 28 and 33. The doors 3 and 6 are then again closed, while at the same time the piston rods 31 and 34, respectively, of said rams are retracted to place the trolley-advancing pawls 26 and 35 controlled by the respective rods immediately ahead of the related trolleys in position for a subsequent pushing movement thereagainst. When the doors close, the switch element 57 is again moved to its open position while the switch element 56 is moved to its circuit closing position, ready for the next circuit closing movement of the timer 50.

It will be noted that the rack 18 which was fed or pushed from the cabinet by the action of the ram 28, as previously described, would be in the way of and would prevent the doors 6 from being closed were it not for the sloping portion 8a of the rail 8 ahead of the cabinet 1. The endmost rack, and its trolley 19, being pushed onto said sloping rail portion 8a, immediately rolls of itself along said sloping portion and thus is clear of the doors 6 by the time the latter are being closed. The air-flow retarders 44 in the air lines 41 and 42 to and from the cylinders 12 and 16 prevent the doors 6 particularly from possibly closing too fast, and may be adjusted so that the pairs of doors 3 and 6 will close in the proper overlapping relation.

All of the above operations having been effected, cooking operations within the cabinet proceed until the timer 50 again functions to close the circuit 48 and start another rack feeding and discharge cycle, as above described.

It is to be noted that the above rack feeding mechanism is not necessarily associated with an enclosing cabinet or the like, but may be employed out in the open, at any place where it may be of service.

From the foregoing description it will be readily seen that there has been produced such an apparatus as will substantially fulfill the objects of the invention, as set forth herein.

While this specification sets forth in detail the present and preferred details of the apparatus, still in practice such deviations therefrom may be resorted to as do not form a departure from the spirit of the invention, as defined by the appended claims.

Having thus described the invention, the following is claimed as new and useful, and upon which Letters Patent are desired:

1. In combination, an elongated food processing cabinet, normally closed doors at the opposed entry and exit ends thereof, a horizontal rail suspended in and extending the full length of the cabinet and projecting some distance from the cabinet at both ends thereof, a plurality of food-supporting racks in the cabinet equally spaced along and below the rail and substantially filling the cabinet from end to end thereof, trolleys riding the rail and from which the racks are suspended, a single rack-suspending trolley riding the rail a predetermined distance back from the entry end of the cabinet so as to be clear of the adjacent doors when the latter are opened, time controlled means to open and close all the doors simultaneously, a normally retracted reciprocating mechanism for engaging and moving all the trolleys in the cabinet simultaneously and away from the entry end of the cabinet a distance equal to the spacing between adjacent trolleys whereby to discharge the rearmost trolley from the exit end of the cabinet while leaving an unoccupied space in the cabinet at the entry end thereof, another normally retracted reciprocating mechanism to move said single trolley from outside the cabinet into said unoccupied space within the cabinet, means controlled by the opening of the doors to place said mechanism in operation to so move the trolleys, and means then functioning to return said mechanism to their initial retracted positions and to cause the door control means to function to then close the door.

2. An apparatus for intermittently feeding food racks along and through a cabinet having entry and exit doors at its opposite ends, the apparatus comprising compressed air rams operatively connected to the different doors to open and close the same, air supply and return lines leading to and from the opposite ends of the rams, a valve interposed in the lines to control the air flow to one end or the other of the rams, rack feeding means comprising another compressed air ram, air supply and return lines leading to the opposite ends of said other ram, another valve interposed in the last named lines to control the air flow to one end or the other of the other ram, retractible means connected to said other ram disengageably and operatively engaging the racks to so feed the same upon movement of the piston rod of said other ram in one direction, means normally acting on the first valve to dispose the same so that air will be fed to the related rams in a direction to cause the same to close the doors, an electric device connected to the first valve to actuate the same so that air will be fed to the related rams in a direction to cause the doors to open, means acting on said other valve to dispose the same so that air will be fed to the other ram in a direction to retract said retractible means, another normally idle electric device connected to said other valve to actuate the other ram in a direction to advance the retractible means in a rack feeding direction, a normally open circuit in which the first electric device is interposed, another normally open circuit in which said other electric device is interposed, timer actuated means to close the first circuit whereby to energize the first device and cause the related rams to open the doors, a normally open switch in the other circuit, and means functioning upon opening of the doors to close said switch whereby to then energize the other electric device.

3. An apparatus, as in claim 2, in which the switch includes a projecting switch-closing element; the last named means comprising a member rigid with one door and positioned to engage and move said element to a switch closing position upon said door reaching a fully open position.

4. An apparatus, as in claim 2, with an audible signal circuit connected in parallel to the first circuit and energized when the first circuit is initially closed, and means to open the signal circuit upon the second circuit being closed.

References Cited in the file of this patent

UNITED STATES PATENTS

| | | |
|---|---|---|
| 1,411,811 | Smith | Apr. 4, 1922 |
| 1,711,100 | Payzant | Apr. 30, 1929 |
| 1,817,810 | Emerson | Aug. 4, 1931 |
| 1,921,592 | Talley | Aug. 8, 1933 |
| 1,964,605 | Tench | June 26, 1934 |
| 2,502,940 | Gelbman | Apr. 4, 1950 |
| 2,623,650 | Allen | Dec. 30, 1952 |
| 2,651,689 | Bame | Sept. 8, 1953 |
| 2,942,742 | Wilbur | June 28, 1960 |
| 2,943,580 | Burrows | July 5, 1960 |
| 2,988,014 | Pianowski | June 13, 1961 |